United States Patent
Raj et al.

(10) Patent No.: US 11,635,958 B1
(45) Date of Patent: Apr. 25, 2023

(54) MULTI-PORT REGISTER FILE FOR PARTIAL-SUM ACCUMULATION

(71) Applicant: GlobalFoundries U.S. Inc., Malta, NY (US)

(72) Inventors: Vivek Raj, Bangalore (IN); Gregory A. Northrop, Everett, WA (US); Shashank Nemawarkar, Austin, TX (US); Shivraj Gurpadappa Dharne, Bangalore (IN)

(73) Assignee: GLOBALFOUNDRIES U.S. Inc., Malta, NY (US)

( * ) Notice: Subject to any disclaimer, the term of this patent is extended or adjusted under 35 U.S.C. 154(b) by 0 days.

(21) Appl. No.: 17/567,209

(22) Filed: Jan. 3, 2022

(51) Int. Cl.
*G06F 9/30* (2018.01)
*G06F 7/544* (2006.01)

(52) U.S. Cl.
CPC ........ *G06F 9/30029* (2013.01); *G06F 9/3013* (2013.01); *G06F 7/5443* (2013.01)

(58) Field of Classification Search
CPC ... G06F 9/30029; G06F 9/3013; G06F 7/5443
See application file for complete search history.

(56) References Cited

U.S. PATENT DOCUMENTS

| | | | |
|---|---|---|---|
| 6,557,022 B1 | 4/2003 | Sih et al. | |
| 7,051,186 B2 | 5/2006 | Asaad et al. | |
| 8,015,229 B2 | 9/2011 | Strom et al. | |
| 2017/0126245 A1* | 5/2017 | Shem | H01L 27/14609 |
| 2018/0101359 A1* | 4/2018 | Harada | G06N 3/0635 |
| 2021/0125046 A1* | 4/2021 | Moshovos | G06N 3/063 |
| 2022/0171605 A1* | 6/2022 | Willcock | G06N 3/063 |

* cited by examiner

*Primary Examiner* — Corey S Faherty
(74) *Attorney, Agent, or Firm* — David Cain; Hoffman Warnick LLC

(57) ABSTRACT

Embodiments of the present disclosure provide a multi-port register file, including: a plurality of single-bit data registers for receiving and storing input data; a read path coupled to an output of each of the plurality of data registers; a plurality of AND gates, wherein an output of each of the plurality of data registers is coupled to an input of a respective AND gate of the plurality of AND gates; an input gating signal coupled to another input of each of the plurality of AND gates; a plurality of multi-bit registers, wherein an output of each of the plurality of AND gates is coupled to each of the plurality of multi-bit registers; and a write disable circuit coupled to the input gating signal for disabling a write signal applied to each of the plurality of multi-bit registers.

18 Claims, 8 Drawing Sheets

MULTI-PORT REGISTER FILE FOR PARTIAL-SUM ACCUMULATION

TECHNICAL FIELD

Embodiments of the disclosure relate generally to a multi-port register file. More specifically, the disclosure provides a low power and low area multi-port register file for partial-sum accumulation.

BACKGROUND

A processing element in a systolic array or convolution engine may include logic circuitry for performing partial-sum accumulation and a multi-port register file for storing intermediate partial-sum results generated by the logic circuitry. During each accumulation cycle, the intermediate partial-sum is continuously read from a register in the multi-port register file, operated on by the logic circuitry (i.e., updated), and written back to the same register in the multi-port register file, resulting in high power consumption every cycle.

SUMMARY

Aspects of the disclosure provide a multi-port register file, including: a plurality of single-bit data registers for receiving and storing input data; a read path coupled to an output of each of the plurality of data registers; a plurality of AND gates, wherein an output of each of the plurality of data registers is coupled to an input of a respective AND gate of the plurality of AND gates; an input gating signal coupled to another input of each of the plurality of AND gates; a plurality of multi-bit registers, wherein an output of each of the plurality of AND gates is coupled to each of the plurality of multi-bit registers; and a write disable circuit coupled to the input gating signal for disabling a write signal applied to each of the plurality of multi-bit registers.

Another aspect of the disclosure is directed to a process for storing accumulation data in a multi-port register file, including: disabling a write signal applied to a plurality of multi-bit registers of the multi-port register file during a partial-sum accumulation process; enabling the write signal applied to the plurality of multi-bit registers of the multi-port register file only when a final accumulation result of the partial-sum accumulation process is available; and writing the final accumulation result to a selected one of the plurality of multi-bit registers of the multi-port register.

A further aspect of the disclosure is directed to a processing element, including: logical circuitry for performing an accumulation process; and a multi-port register file, wherein the multi-port register file includes: a plurality of single-bit data registers for receiving and storing partial-sum data of the accumulation process; a read path coupled to an output of each of the plurality of data registers; a plurality of AND gates, wherein an output of each of the plurality of data registers is coupled to an input of a respective AND gate of the plurality of AND gates; an input gating signal coupled to another input of each of the plurality of AND gates; a plurality of multi-bit registers, wherein an output of each of the plurality of AND gates is coupled to each of the plurality of multi-bit registers; and a write disable circuit coupled to the input gating signal for disabling a write signal applied to each of the plurality of multi-bit registers.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

Figure 1:
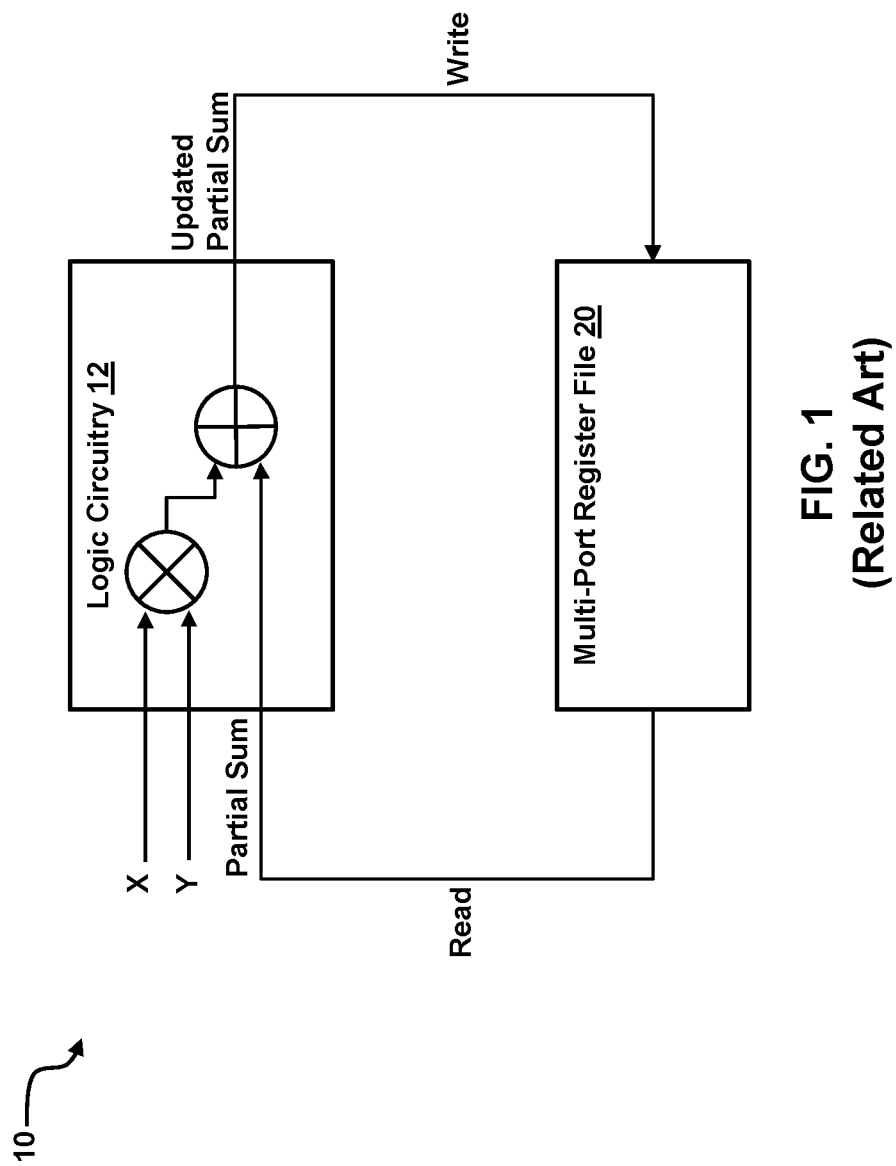
FIG. 1 depicts an example of a conventional processing element including logic circuitry and a multi-port register file.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

An example of a processing element (PE) 10, for example, of a systolic array, is depicted in FIG. 1. As shown, the PE 10 may include logic circuitry 12 and a multi-port register file 20. In this example, the logic circuitry 12 includes a multiply-accumulate (MAC) unit. In operation, after a partial sum is read from a register in the multi-port register file 20, the logic circuitry 12 is configured to update the partial sum by adding the partial sum to the product of two inputs X and Y (updated partial sum=partial sum+ (X·Y)). The updated partial sum is then written back to the same register in the multi-port register file 20.

Figure 2:
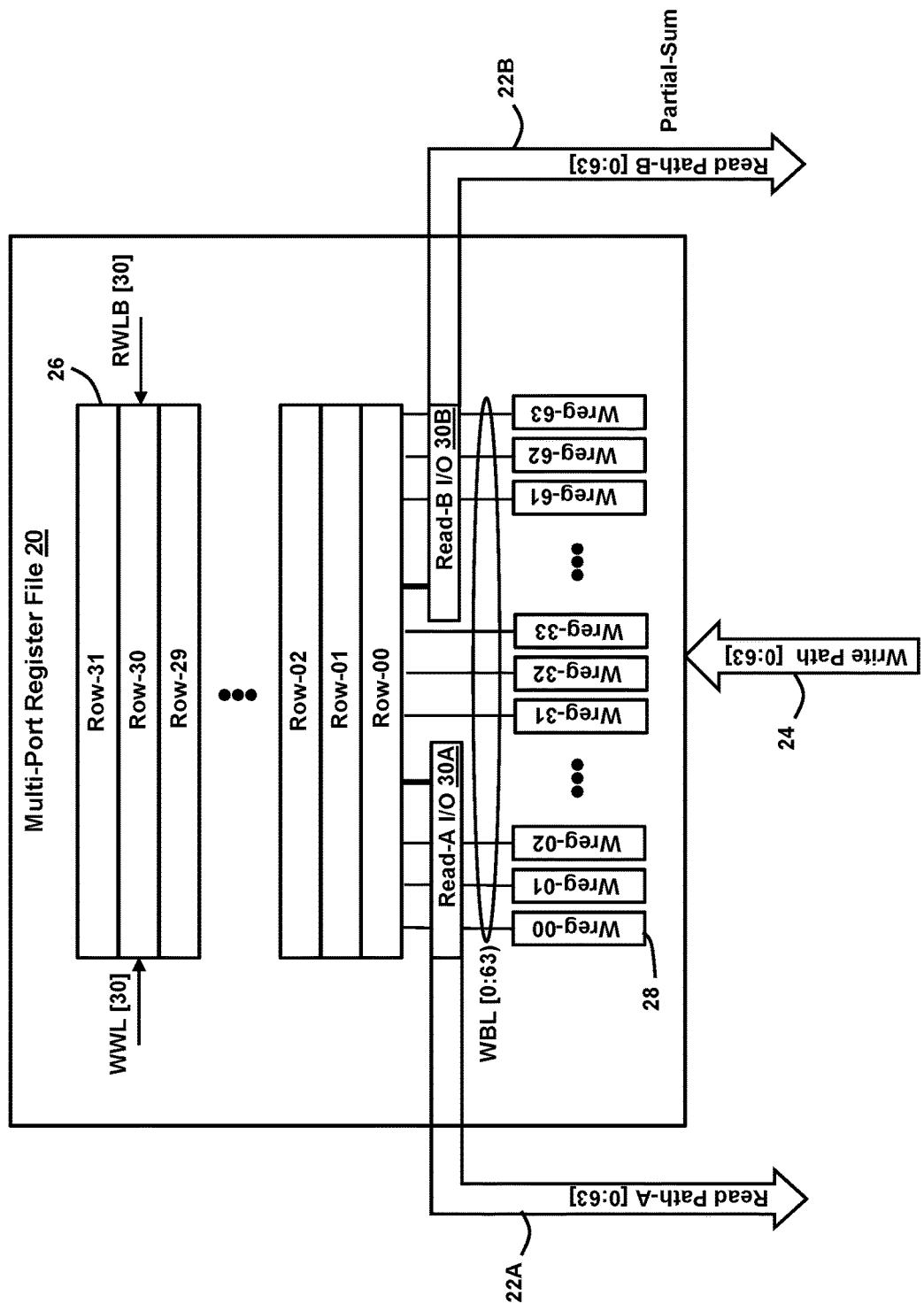
FIG. 2 depicts an example of a conventional 3-port (2R1W) register file for use in the processing element of FIG. 1.

An example of a conventional 32×64 bit, 3-port (2R1 W) register file 20 is depicted in FIG. 2. As shown, the register file 20 includes two 64-bit read paths, read path 22A and read path 22B, and a single 64-bit write path 24. During a read operation, partial-sum data is read via one of the read path 22A or read path 22B from a register 26 of the register file 20 being accumulated. During accumulation, updated partial-sum data (e.g., updated by logic circuitry 12 (FIG. 1)) is written back to the same register 26 in the register file 20 via the write path 24. Upon completion of the accumulation process, the final sum is also stored in the same register in the register file 20 via the write path 24.

Figure 3:
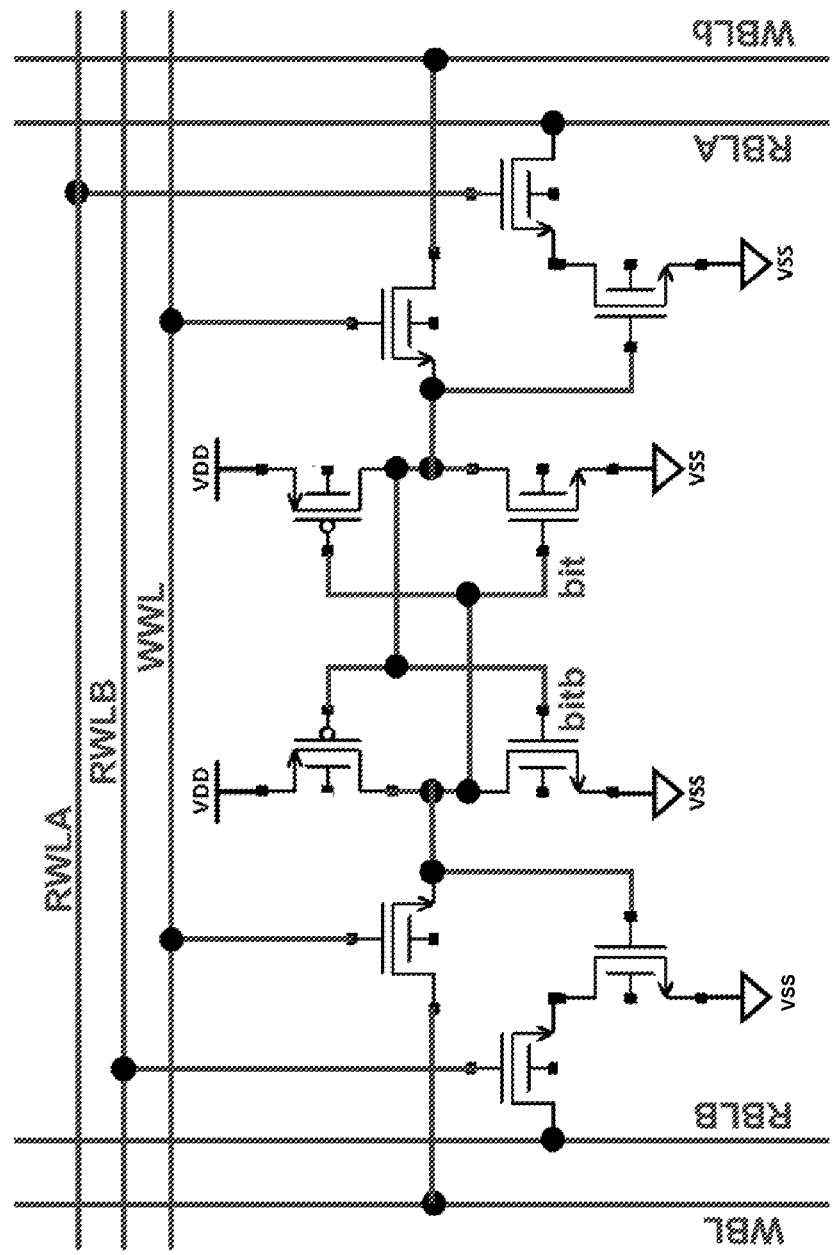
FIG. 3 depicts an example of a ten transistor (10T) 3-port 2R1 W bitcell for use in the register file of FIG. 2.

The register file 20 further includes thirty-two 64-bit registers 26, designated as row-00 to row-31 in FIG. 2, sixty-four write data registers 28, designated as wreg-00 to wreg-63 in FIG. 2, and corresponding read I/O logic read-A I/O logic 30A and read-B I/O logic 30B. Each bit in each register 26 in the register file 20 may be provided, for example, using a ten-transistor (10T) 3-port 2R1W bitcell 32 (FIG. 3).

Figure 4:
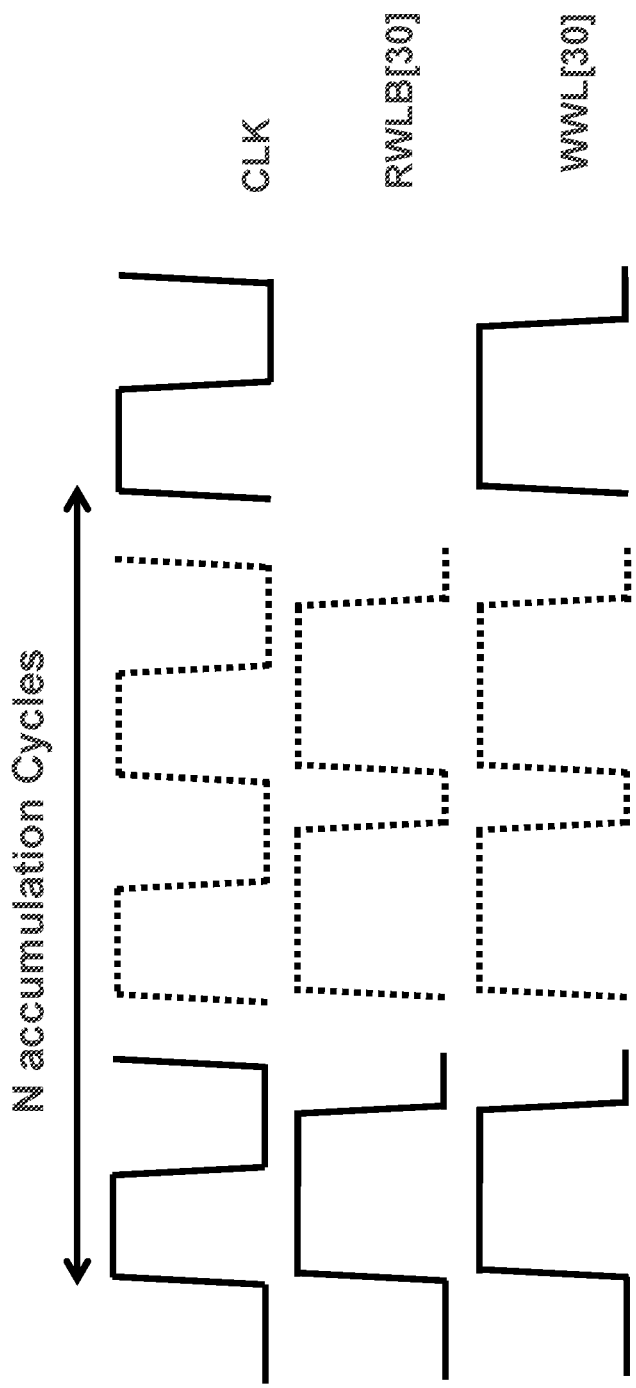
FIG. 4 depicts a timing diagram showing the state of a read signal and write signal for the reading/writing of data from/to a register in the register file of FIG. 2 over N accumulation cycles.

The operation of the register file 20 with respect to the row-30 register 26 of the register file 20 will now be described with reference to FIGS. 2 and 4. FIG. 4 depicts a timing diagram showing the state of the read signal RWLB [30] and the write signal WWL[30] for reading/writing data from/to the row-30 register 26 of the register file 20 over N accumulation cycles. In this example, during each accumulation cycle, partial-sum data is read from the row-30 register 26 via the read path 22B in response to the read signal RWLB[30], and updated partial-sum data is written back to the row-30 register 26 via the write path 24 and write data registers 28 in response to the write signal WWL[30]. As shown in FIG. 4, read and write operations occur during every accumulation cycle, until the final accumulation value is written into the row-30 register 26. This results in a high power consumption (e.g., switching power) every cycle until the accumulation for the row-30 register 26 is complete.

Figure 5:
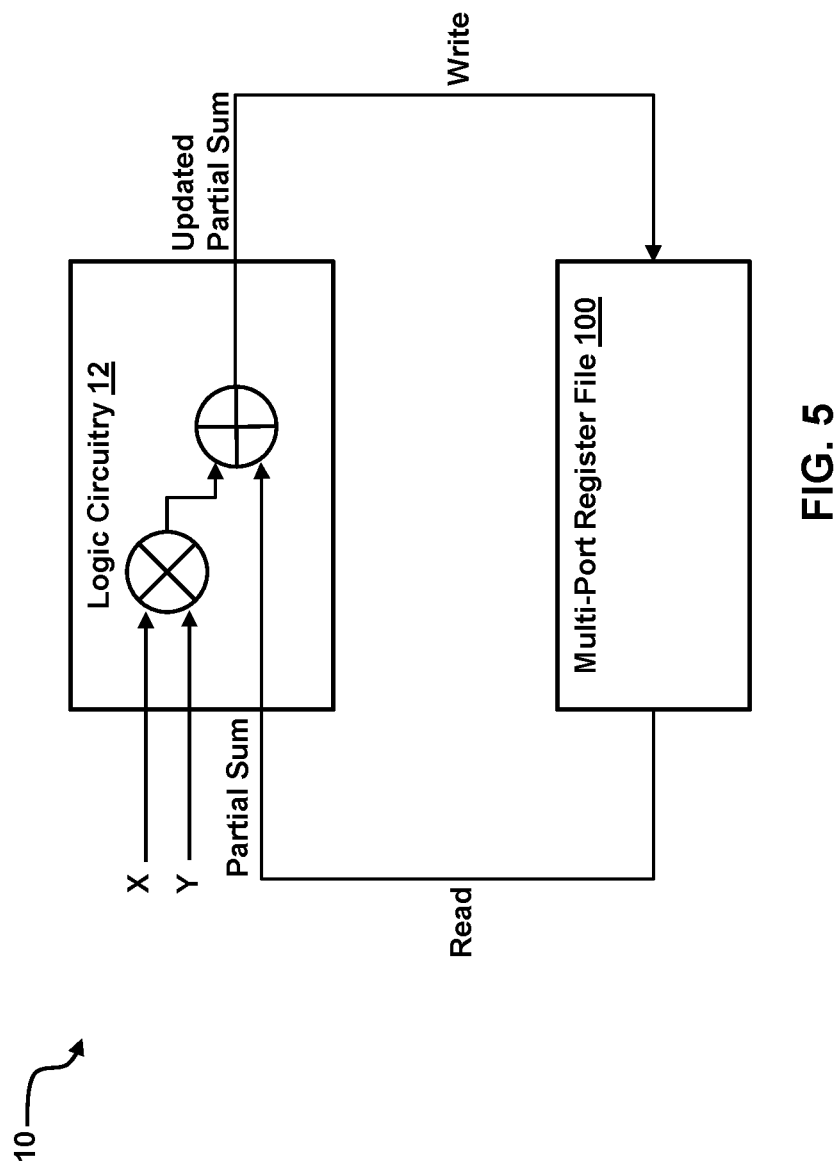
FIG. 5 depicts a processing element in accordance with embodiments of the disclosure.

An example of another processing element (PE) 10' according to embodiments of the disclosure is depicted in FIG. 5. As shown, the PE 10' may include logic circuitry 12 and a multi-port register file 100 in accordance with embodiments of the disclosure. In this example, the logic circuitry 12 includes a multiply-accumulate (MAC) unit. In operation, after a partial sum is read from a register 106 (FIG. 6) in the multi-port register file 100, the logic circuitry 12 is configured to update the partial sum by adding the partial sum to the product of two inputs X and Y. The updated partial sum is then written back to the same register 106 in the multi-port register file 100.

Figure 6:
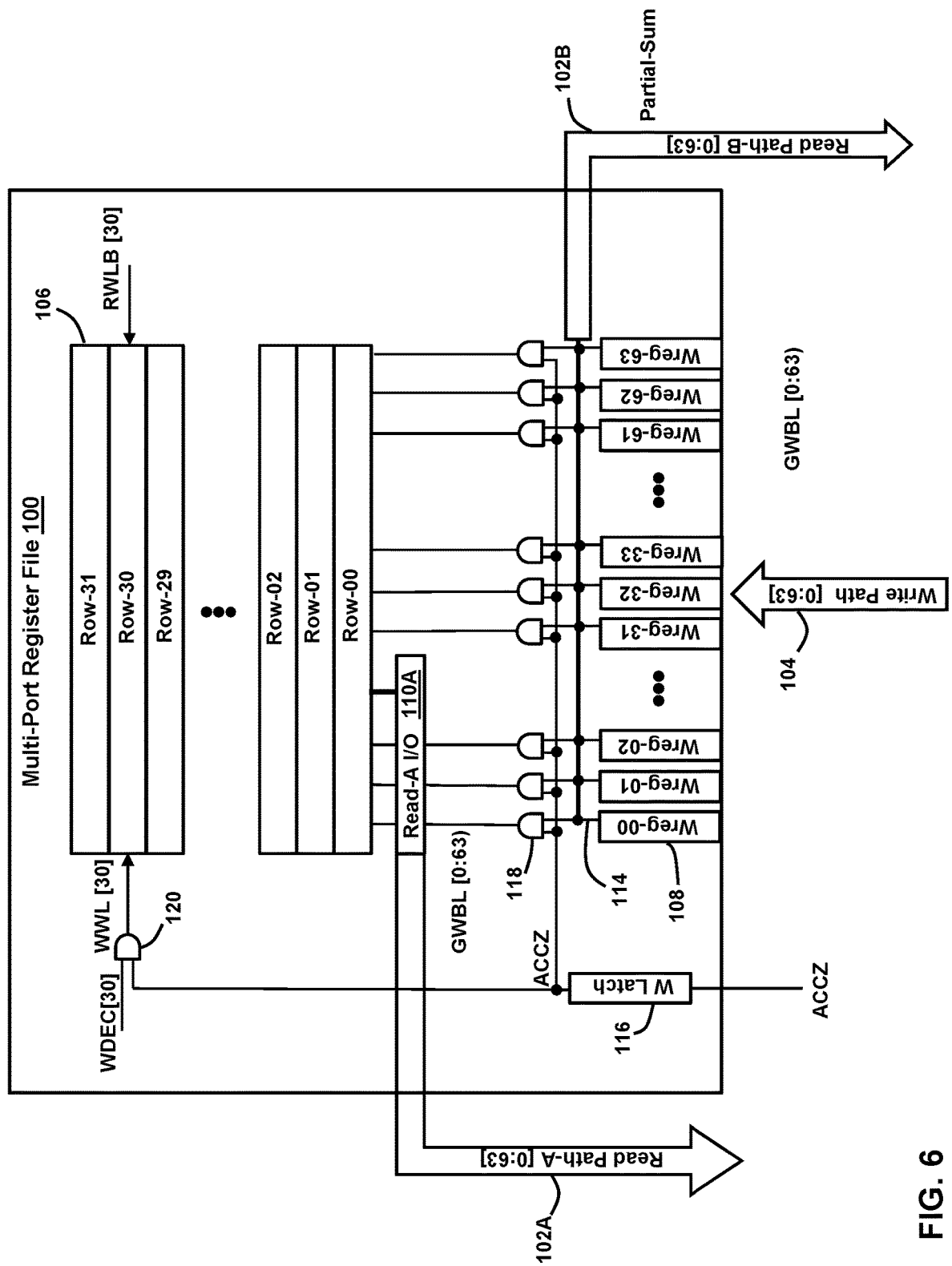
FIG. 6 depicts a 3-port (2R1W) register file for use in the processing element of FIG. 5 according to embodiments of the disclosure.

An example of an N×M bit (e.g., 32×64 bit), 3-port register file 100 with two read ports and one write port (2R1W) in accordance with embodiments of the disclosure is depicted in FIG. 6. As will be described in greater detail below, the register file 100 is configured, for example, to reduce write power consumption during accumulation, reduce read power consumption during accumulation, and reduce the area required to implement the register file 100 (e.g., on an integrated circuit chip).

Figure 7:
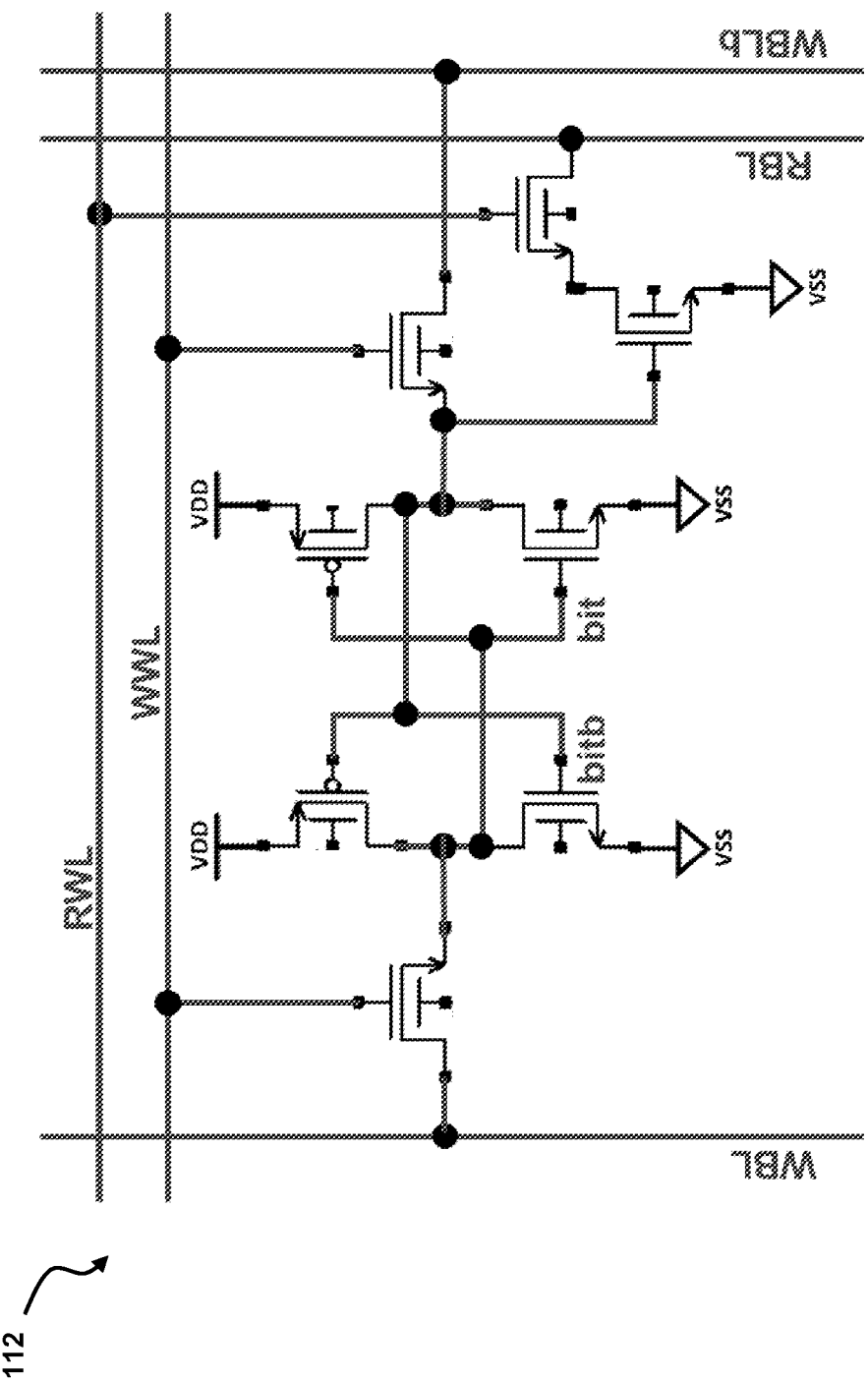
FIG. 7 depicts an example of an eight-transistor (8T) 2-port 1R1 W bitcell for use in the register file of FIG. 6.

As shown in FIG. 6, the register file 100 includes two 64-bit read paths, read path 102A (with read-A I/O logic 110A) and read path 102B, and a single 64-bit write path 104. The register file 100 further includes thirty-two 64-bit addressable registers 106, designated row-00 to row-31 in FIG. 6, and sixty-four single-bit write data and accumulation registers 108 (hereafter "data registers 108"), designated as wreg-00 to wreg-63 in FIG. 6. Each bit in each register 106 in the register file 100 may be provided, for example, using an eight-transistor (8T) 2-port bitcell 112 with one read port and one write port (1R1W) (FIG. 7), since only one read path, namely read path 102A, is required for reading data from the registers 106 in the register file 100.

The register file 20 depicted in FIG. 2 requires two 64-bit read paths, read path 22A and read path 22B, and corresponding read I/O logic, read-A I/O logic 30A and read-B I/O logic 30B. Contrastingly, in the register file 100 according to embodiments of the disclosure, partial-sum data is not read out from a register 106 of the register file 100 during an accumulation cycle. This eliminates the need for read-B I/O logic and associated peripheral circuitry (e.g., such as the read-B I/O logic 30B for read path 22B in the register file 20 of FIG. 2). Advantageously, this reduces the area required to implement the register file 100.

According to embodiments of the disclosure, the register file 100 is configured to read out partial-sum data directly from the output 114 of each data register 108. During accumulation, the partial-sum data read out directly from the output 114 of each data register 108 is provided via the read path 102B to logic circuitry (e.g., logic circuitry 12 (FIG. 5)). After the partial-sum data is updated by the logic circuitry, the updated partial-sum data is written back to the data registers 108 via the write path 104 and not to the registers 106 in the register file 100. To this extent, the data registers 108 of the register file 100 also serve as accumulation registers. By reading the partial-sum data directly from the data registers 108, thereby eliminating read operations for reading partial-sum data from a register 106 in the register file 100, the read power consumption of the register file 100 is reduced.

According to embodiments of the disclosure, the write signal WWL of the register file 100 may be selectively disabled to prevent switching of the write signal WWL during accumulation and to prevent partial-sum data from being written from the data registers 108 to a register 106 in the register file 100 during accumulation. The write signal WWL is only enabled to allow the final sum value of the accumulation process to be written from the data registers 108 into a register 106 in the register file 100. By eliminating switching of the write signal WWL during accumulation and eliminating any write operations for writing partial-sum data to a register 106 in the register file 100 during accumulation, the write power consumption of the register file 100 is reduced. According to embodiments, any references to a "signal" herein may refer to specific hardware, wiring, etc., for transmitting the signal.

An input gating signal ACCZ is provided in accordance with embodiments of the disclosure for disabling the write signal WWL during accumulation and for enabling the write signal WWL to write a final accumulation value in a register 106 in the register file 100. As shown in FIG. 6, the input gating signal ACCZ is provided to the register file 100 and stored in a write latch 116.

As depicted in FIG. 6, the register file 100 further includes a plurality of logical AND gates 118. According to embodiments of the disclosure, the output 114 of each data register 108 and the input gating signal ACCZ are coupled to the inputs of a respective AND gate 118 of the plurality of AND gates 118. The AND gates 118 are configured to selectively pass the outputs 114 of the data registers 108 to the data bit lines GWBL [0:63] of the register file 100 based on the state of the input gating signal ACCZ.

The input gating signal ACCZ is also coupled to an input of a plurality of logical AND gates 120 (only one is shown in FIG. 6), each of which is coupled to a respective register 106 in the register file 100. An address selection signal WDEC provided by a write address decoder (not shown) is coupled to another input of each AND gate 120. The output of each AND gate 120 is the write signal WWL for its respective register 106 in the register file 100

The AND gates 120 are configured to selectively disable the write signal WWL for the registers 126 in the register file 100 based on the state of the input gating signal ACCZ. According to embodiments of the disclosure, the input gating signal ACCZ is held low to disable the write signal WWL during accumulation. To this extent, switching of the write signal WWL is prevented during accumulation. The input gating signal ACCZ goes high only upon completion of the accumulation process to allow the final accumulation result to be written to the register 106 in the register file 100 designated by the address selection signal WDEC.

The AND gates 118 are configured to selectively pass the outputs 114 of the data registers 108 to the data bit lines GWBL [0:63] based on the state of the input gating signal ACCZ. According to embodiments of the disclosure, the input gating signal ACCZ is held low to disable and prevent switching of the data bit lines GWBL [0:63] during accumulation. When the input gating signal ACCZ goes high upon completion of the accumulation process, the final accumulation result stored in the data registers 108 is written via the data bit lines GWBL [0:63] to the register 106 in the register file 100 designated by the address selection signal WDEC.

Figure 8:
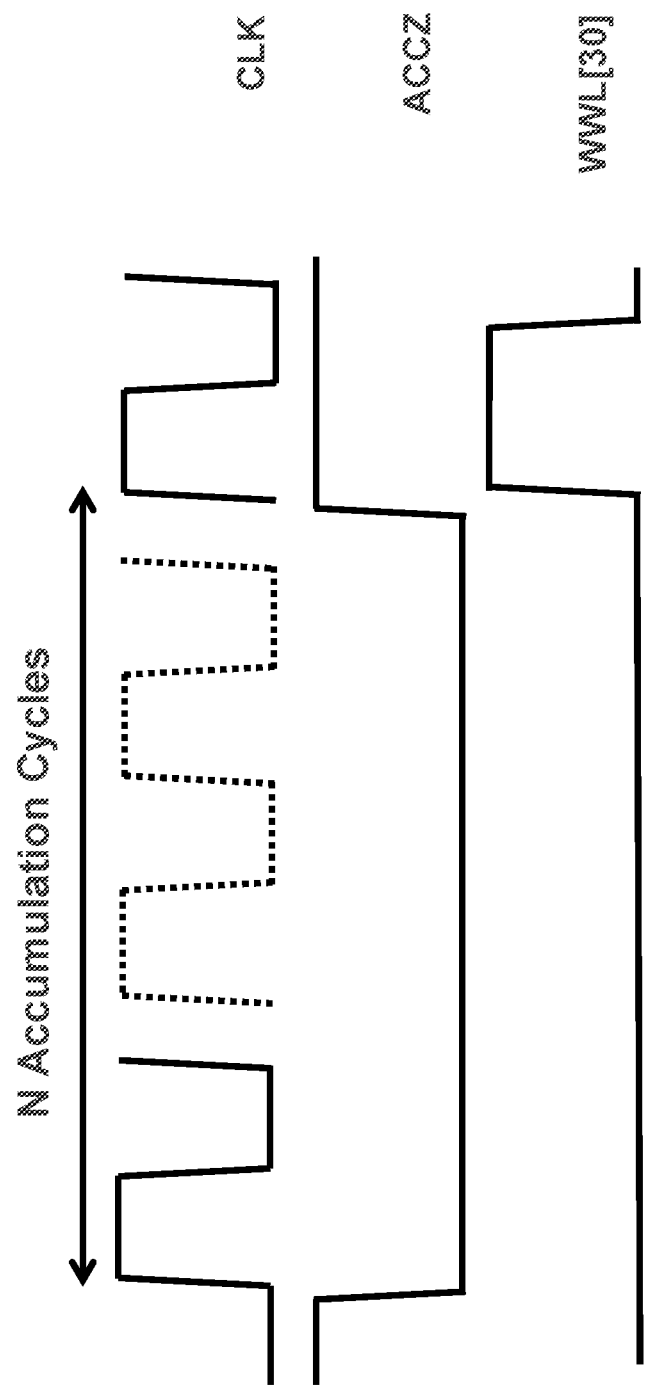
FIG. 8 depicts a timing diagram showing the state of an input gating signal and a write signal of the register file of FIG. 6 over N accumulation cycles according to embodiments of the disclosure.

The operation of the register file 100 with respect to the row-30 register 106 will now be described with reference to FIGS. 6 and 8. FIG. 8 depicts a timing diagram showing the state of the input gating signal ACCZ and the write signal WWL[30] for writing data to the row-30 register 106 over N accumulation cycles. In this example, the input gating signal ACCZ is held low during the accumulation cycles of the accumulation process. As a result, the outputs of the AND gates 118 and the AND gates 120 are low. This disables the write operation of partial-sum data into the row-30 register 106 of the register file 100 during accumulation. During accumulation, the partial-sum data stored in the data registers 108 is read directly from the outputs 114 of data registers 108 via the read-path read path 102B, instead of from a register 106 of the register file 100. Advantageously, this reduces read power consumption during the accumulation process.

According to embodiments of the disclosure, the input gating signal ACCZ is set to high when the accumulation process is complete. In response, the data bit lines GWBL [0:63] are enabled via the AND gates 118. To enable the writing of the final accumulation value from the data registers 108 into the row [30] register 106 in the register file 100, the address selection signal WDEC [30] is set to high by the address decoder. With the input gating signal ACCZ and the address selection signal WDEC [30] both set to high, the write signal WWL [30] output by the AND gate 120 is also high, which allows the final accumulation result to be written from the data registers 118 to the row [30] register 126 of the register file 100.

The register file 20 depicted in FIG. 2 requires two 64-bit read paths, read path 22A and read path 22B, and corresponding read I/O logic, read-A I/O logic 30A and read-B I/O logic 30B. As such, the bits in each register 26 in the register file 20 are implemented using a 3-port bitcell, such as the ten-transistor (10T) 3-port 2R1 W bitcell 32 depicted in FIG. 4. According to embodiments of the disclosure, however, the bits in each register 106 in the register file 100 may be implemented using a 2-port bitcell, such as the eight-transistor (8T) 2-port 1R1 W bitcell 112 shown in FIG. 6. Comparing FIGS. 4 and 6, it is readily apparent that the eight-transistor (8T) 2-port 1R1 W bitcell 112 used in the register file 100 is less complex, requires fewer components, and requires less area than the ten-transistor (10T) 3-port 2R1 W bitcell 32 used in the register file 20. To this extent, the area required to implement the register file 100 is reduced.

In addition to the power and area advantages detailed above, there are numerous additional differences between the register file 20 and the register file 100 according to embodiments. For example, the register file 20 requires 3-port bitcells and cannot be implemented using 2-port bitcells, whereas the register file 100 can be implemented using 2-port bitcells. Further, in the register file 100, the registers 106 internal to the register file 100 are not written to nor read from during accumulation, while in the register file 20, register write and read operations occur during accumulation (i.e., the registers 26 internal to the register file 20 are read).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As used herein, the term "configured," "configured to" and/or "configured for" can refer to specific-purpose patterns of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A multi-port register file, comprising:
   a plurality of single-bit data registers for receiving and storing input data;

a read path coupled to an output of each of the plurality of data registers;

a plurality of AND gates, wherein the output of each of the plurality of data registers is coupled to an input of a respective AND gate of the plurality of AND gates;

an input gating signal coupled to another input of each of the plurality of AND gates;

a plurality of multi-bit registers, wherein an output of each of the plurality of AND gates is coupled to each of the plurality of multi-bit registers; and a write disable circuit coupled to the input gating signal for disabling a write signal applied to each of the plurality of multi-bit registers.

2. The multi-port register file of claim 1, further comprising a write path coupled to an input of each of the plurality of data registers.

3. The multi-port register file of claim 1, wherein the disable circuit further comprises an AND gate, wherein an input of the AND gate of the disable circuit is coupled to the input gating signal.

4. The multi-port register file of claim 3, wherein an address selection signal for selecting one of the multi-bit registers is coupled to another input of the AND gate of the disable circuit.

5. The multi-port register file of claim 1, wherein multi-port register file comprises a 3-port (2R1 W) register file.

6. The multi-port register file of claim 1, wherein each of the plurality of multi-bit registers includes a plurality of bitcells, and wherein each bitcell comprises an eight-transistor 2-port 1R1 W bitcell.

7. The multi-port register file of claim 1, wherein the multi-port register file is coupled to logical circuitry for performing an accumulation process.

8. The multi-port register file of claim 7, wherein the data registers are configured to store partial-sum data of the accumulation process, and wherein the input gating signal is low during the accumulation process to disable the write signal applied to each of the plurality of multi-bit registers.

9. The multi-port register file of claim 7, wherein the input gating signal is configured to go high to enable a final result of the accumulation process to be written from the data registers to a selected multi-bit register.

10. A process for storing accumulation data in a multi-port register file, comprising:

disabling a write signal applied to a plurality of multi-bit registers of the multi-port register file during a partial-sum accumulation process;

enabling the write signal applied to the plurality of multi-bit registers of the multi-port register file in response to a final accumulation result of the partial-sum accumulation process being available; and writing the final accumulation result to a selected one of the plurality of multi-bit registers of the multi-port register.

11. The process of claim 10, further comprising, while the write signal applied to the plurality of multi-bit registers of the multi-port register file is disabled:

writing partial-sum data of the accumulation process in a plurality of data registers; and upon completion of the accumulation process, writing the final accumulation result of the accumulation process in the plurality of data registers.

12. The process of claim 11, further comprising writing the final accumulation result of the accumulation process from the plurality of data registers to the selected multi-bit register when the write signal is enabled.

13. The process of claim 12, wherein, while the write signal applied to the plurality of multi-bit registers of the multi-port register file is disabled, the accumulation process is configured to read the partial-sum data from an output of each of the plurality of data registers.

14. A processing element, comprising:

logical circuitry for performing an accumulation process; and a multi-port register file, wherein the multi-port register file includes:

a plurality of single-bit data registers for receiving and storing partial-sum data of the accumulation process;

a read path coupled to an output of each of the plurality of data registers;

a plurality of AND gates, wherein the output of each of the plurality of data registers is coupled to an input of a respective AND gate of the plurality of AND gates;

an input gating signal coupled to another input of each of the plurality of AND gates;

a plurality of multi-bit registers, wherein an output of each of the plurality of AND gates is coupled to each of the plurality of multi-bit registers; and a write disable circuit coupled to the input gating signal for disabling a write signal applied to each of the plurality of multi-bit registers.

15. The processing element of claim 14, wherein the disable circuit further comprises an AND gate, wherein an input of the AND gate of the disable circuit is coupled to the input gating signal, and wherein an address selection signal for selecting one of the multi-bit registers is coupled to another input of the AND gate of the disable circuit.

16. The processing element of claim 14, wherein multi-port register file comprises a 3-port (2R1 W) register file, and wherein each of the plurality of multi-bit registers includes a plurality of bitcells, and wherein each bitcell comprises an eight-transistor 2-port 1R1 W bitcell.

17. The processing element of claim 15, wherein the input gating signal is low during the accumulation process to disable the write signal applied to each of the plurality of multi-bit registers.

18. The processing element of claim 17, wherein the plurality of data registers are configured to receive and store a final result of the accumulation process, and wherein the input gating signal is configured to go high to enable the final result of the accumulation process to be written from the data registers to a selected multi-bit register.

* * * * *